United States Patent Office 3,255,177
Patented June 7, 1966

3,255,177
METHYL N-ACYL-3,4-O-ISOPROPYLIDENE-THIOLINCOSAMINIDES
William Schroeder, Pavilion Township, Kalamazoo County, Mich., assignor to The Upjohn Company, Kalamazoo, Mich., a corporation of Delaware
No Drawing. Filed Apr. 13, 1964, Ser. No. 359,485
2 Claims. (Cl. 260—210)

The present invention relates to novel compounds and is more particularly concerned with methyl N-acyl-3,4-O-isopropylidenethiolincosaminides [methyl 6-acylamido-6,8 - dideoxy-3,4-O-isopropylidene-1-thio-D-erythro-D-galacto-octopyranosides] (II) and a method for the preparation thereof.

The novel compounds of this invention and the process for the production thereof can be illustratively represented in the following manner:

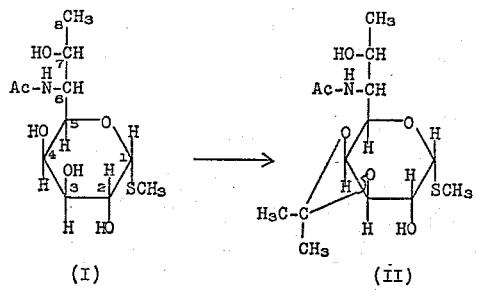

wherein Ac is an acyl radical of a hydrocarbon carboxylic acid containing from 2 to 12 carbon atoms, inclusive.

The process of the present invention comprises: treating a methyl N-acylthiolincosaminide (I) with an excess of acetone in the presence of a strong acid catalyst such as sulfuric acid, p-toluenesulfonic acid, ethanesulfonic acid, m-chlorobenzenesulfonic acid, and the like to give a methyl N-acyl-3,4-O-isopropylidene thiolincosaminide (II).

The novel compound, methyl N-acetyl-3,4-O-isopropylidenethiolincosaminide, is an important intermediate in the preparation of pharmacologically active products. For example, methyl N-acetyl-3,4-O-isopropylidenethiolincosaminide (II) can be converted with nickel in a lower alkanol to N-acetyl-3,4-O-isopropylidene-1-deoxylincosamine (or N-acetyl-3,4-O-isopropylidene-1,5-anhydrolincosaminol), which can be alkylated with methyl iodide to 7 - O - methyl-N-acetyl-3,4-O-isopropylidene-1-deoxylincosamine (7-O-methyl-N-acetyl-3,4-O-isopropylidene-1,5-anhydrolincosaminol). The last named compound is highly active against *Trichophyton rubrum*, *Pseudomonas fluorescens*, and other microorganisms. The antimicrobial activity of 7-O-methyl-N-acetyl-3,4-O-isoproylidene-1-deoxylincosamine can be utilized for washing equipment in hospitals, homes, and microbiological laboratories and for washing medical and surgical instruments as well as clothing used in laboratories specializing in the cultivation of microorganisms. Also, in such locations where sterile backgrounds are necessary, floors, walls and ceilings can be washed with aqueous solutions of these compounds.

Other N-acyl-7-O-methyl-3,4-O-isopropylidene-1-deoxylincosamines, wherein the acyl group is propionyl, butyryl, valeryl, hexanoyl, benzoyl, phenylacetyl, phenylpropionyl, and the like can be likewise used for sanitation in homes, hospitals, laboratories, and the like.

The starting material, methyl N-acetylthiolincosaminide, is a novel starting material and is produced as shown in the preparations.

In carrying out the process of the present invention, methyl N-acetylthiolincosaminide, dissolved in acetone, is stirred at room temperature with a small amount of a strong acid such as sulfuric, toluenesulfonic, benzenesulfonic, chlorobenzenesulfonic acid, and the like. The amount of strong acid is generally from 0.01% to 0.5%. The reaction time varies according to the temperature employed in carrying out the reaction; if at room temperature, between 1 and 4 days are necessary. At the termination of the reaction, the reaction mixture is neutralized by adding a base and the material is recovered in conventional manner, such as by evaporation and extraction of the thus-obtained residue with organic solvents such as acetone, ether, methanol, and the like.

The following preparations and examples are illustrative of the process and products of the present invention, but are not to be construed as limiting.

PREPARATION 1

*Methyl thiolincosaminide*

A solution of 4 g. of lincomycin [U.S. Patent 3,086,-912] in 20 ml. of hydrazine hydrate (98–100%) was refluxed for 21 hours; excess hydrazine hydrate was then removed in vacuo under nitrogen at steam bath temperature. The residue, a pasty mass of crystals, was cooled, acetonitrile was added, and the mixture was stirred until the crystals were suspended. The crystals were collected on a filter, washed with acetonitrile and with ether. The yield of white, crystalline methyl thiolincosaminide after drying in vacuo at room temperature was 2.1 g. (84%). Recrystallization was accomplished by dissolving the methyl thiolincosaminide in hot dimethylformamide and adding an equal volume of ethylene glycol dimethyl ether.

Methyl thiolincosaminide has a melting point of 225–228° C., an optical rotation of $[\alpha]_D^{25} +276°$ (c.=0.768 in water), and a pKa' of 7.45.

*Analysis.*—Calcd. for $C_9H_{19}NO_5S$: C, 42.7; H, 7.56; N, 5.53; S, 12.66. Found: C, 42.6; H, 7.49; N, 5.75; S, 12.38.

PREPARATION 2

*Methyl N-acetylthiolincosaminide*

Five grams of methyl thiolincosaminide (about 0.02 mole) was suspended with stirring in 50 ml. of methanol and treated with 4.04 g. (about 0.04 mole) of acetic anhydride. The starting material dissolved almost completely, and thereafter the mixture became solid. After 18 hours at room temperature (about 25° C.), the solid was filtered, washed with methanol, and dried in a vacuum oven at 50° C. and 15 mm. pressure; yield, 4.58 g. (79%) of crystalline product melting at 242–245° C. This product was recrystallized from absolute methanol to give colorless needles of methyl N-acetylthiolincosaminide having a melting point of 243–245° C. and a rotation of $[\alpha]_D +265°$ (c.=0.7374, water).

*Analysis.*—Calcd. for $C_{11}H_{21}O_6NS$: C, 44.72; H, 7.17; N, 4.74; S, 10.85. Found: C, 44.87; H, 7.10; N, 4.65; S, 10.99.

In the manner shown in Preparation 2, other acyl derivatives of methyl thiolincosaminide can be made, using other anhydrides such as propionic anhydride, butyric anhydride, valeric anhydride, hexanoic anhydride, benzoic anhydride, phenylacetic anhydride, phenylpropionic anhydride, and the like. Representative methyl N-acylthiolincosaminides thus obtained include methyl N-propionyl-, N-butyryl-, N-valeryl-, N-hexanoyl-, N-benzoyl-, N-phenylacetyl-, N-phenylpropionylthiolincosaminide, and the like.

EXAMPLE 1

*Methyl N-acetyl-3,4-O-isopropylidenethiolincosaminide*

A suspension of 5.3 g. of finely powdered methyl N-acetylthiolincosaminide was stirred for 60 hours at room temperature with 500 ml. of acetone and 0.5 ml. of concentrated sulfuric acid. Most of the starting material was still undissolved at this time so an additional 5 ml. of concentrated sulfuric acid was added; solution quickly resulted. The solution was stirred for 30 minutes at room temperature and added to a suspension of 150 g. of barium carbonate in 100 ml. of water. The mixture was stirred until neutral, barium sulfate and excess carbonate were removed by filtration, and the precipitate was washed with acetone. The filtrate and washings were combined and evaporated to dryness in vacuo at 50° C. The residue was treated with acetone-ether (10:1) and insoluble materials were removed by filtration. The filtrate was evaporated to dryness and the residue was dissolved in 100 ml. of ethanol. Removal of the alcohol by heating in vacuo left a yellow gum which was dissolved in 20 ml. of warm water containing a small amount of sodium carbonate. Some insoluble material was removed by filtration and the filtrate was cooled. The crystals which formed were collected after standing in the refrigerator for 4 hours, washed with cold water, and dried in vacuo; yield of methyl N-acetyl-3,4-O-isopropylidenethiolincosaminide, 2 g. A portion of the crystals, recrystallized from water for analysis, had a melting point of 174–175° C. and a rotation, $[\alpha]_D^{25}+189°$ (c.=0.4136, water).

Analysis.—Calcd. for $C_{14}H_{25}NO_6S$: C, 50.2; H, 7.52; N, 4.17; S, 9.55. Found: C, 49.87; H, 7.46; N, 4.11; S, 9.56.

In the manner given in Example 1, using other methyl N-acylthiolincosaminides, instead of methyl N-acetylthiolincosaminide, produces other methyl N-acyl-3,4-O-isopropylidenethiolincosaminides. Representative compounds thus obtained include methyl N-propionyl, N-butyryl, N-valeryl, N-hexanoyl, N-benzoyl, N-phenylacetyl, N-phenylpropionyl-3,4-O-isopropylidenethiolincosaminide, and the like.

I claim:
1. Methyl N - acyl - 3,4 - O-isopropylidenethiolincosaminides of the formula:

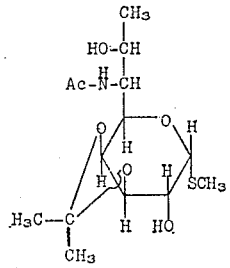

wherein AC is an acyl radical of a hydrocarbon carboxylic acid containing from 2 to 12 carbon atoms, inclusive.

2. Methyl N - acetyl - 3,4-O-isopropylidenethiolincosaminide.

References Cited by the Examiner

Stanek et al.: "The Monosaccharides," 1963, pp. 336, 337, 340 and 341, Academic Press, New York, New York.

LEWIS GOTTS, *Primary Examiner.*

JOHNNIE R. BROWN, *Assistant Examiner.*